United States Patent [19]

Rakoczynski et al.

[11] Patent Number: 4,696,599

[45] Date of Patent: Sep. 29, 1987

[54] SECURE LANDFILL AND METHOD OF OPERATING A LANDFILL FOR HAZARDOUS WASTE

[75] Inventors: Randolph W. Rakoczynski, Niagara Falls; Stephen S. Odojewski, N. Tonawanda; John I. Rolfe, Youngstown, all of N.Y.

[73] Assignee: Waste Resource Associates, Inc., Niagara Falls, N.Y.

[21] Appl. No.: 885,428

[22] Filed: Jul. 14, 1986

[51] Int. Cl.[4] ............................................. C02F 1/00
[52] U.S. Cl. ..................................... 405/129; 210/170
[58] Field of Search ............... 405/128, 129, 36, 53, 405/270; 210/170

[56] References Cited

U.S. PATENT DOCUMENTS 3,705,851 12/1972 Brauer ............................. 405/129 X
4,350,461 9/1982 Valiga .................................. 405/128
4,464,081 8/1984 Hillier et al. ....................... 405/128
4,526,615 7/1985 Johnson ........................... 405/129 X

*Primary Examiner*—David H. Corbin
*Attorney, Agent, or Firm*—Donald C. Studley

[57] ABSTRACT

The present invention relates to a secure landfill and to a method of operating a hazardous waste secure landfill characterized by a substantial reduction in the amount of leachate. The amount of leachate is minimized by maintaining a substantial amount of the atmospheric moisture collected within the confines of the fill separate from the waste material in the fill and removing such uncontaminated moisture from the fill site in an uncontaminated condition. The present landfill arrangement also facilitates the progressive incremental closing and permanent sealing of portions of the landfill while the remainder of the fill remains in active use.

8 Claims, 3 Drawing Figures

SECURE LANDFILL AND METHOD OF OPERATING A LANDFILL FOR HAZARDOUS WASTE

BACKGROUND AND FIELD OF THE INVENTION

The present invention relates to secure chemical waste landfills and to methods of disposing of hazardous wastes in such landfills.

Hazardous chemical wastes are usually residues of chemical, manufacturing, or mining operations. Typical components of such wastes are heavy metals, e.g., chromium or lead and pseudo-metals, e.g., arsenic or selenium, persistent organic materials, frequently in the form of dusts, sludges or slimes.

The problem of the disposal of hazardous chemical waste has been exhaustively treated in the literature. Suffice to say, it is totally unacceptable to dump such wastes into conviently located excavations, or into streams or other bodies of water. Extraordinary care must be taken not to ecologically disturb the surrounding and underlying soil areas, or to pollute or contaminate natural resources. However, hazardous chemical wastes are a fact of life in our society and the safe and secure disposition of such wastes is of the utmost importance. Accordingly, it is a primary purpose of the present invention to provide a secure landfill and a method of utilizing such landfills which will minimize, and preferably eliminate entirely, contamination or ecological disturbance of the surroundings.

In recent years there has been a flurry of activity in the design of better and more secure landfills. The earlier designs secured the materials to be disposed of in the fill, but frequently failed to treat the leachate, some allowed the leachate to drain from the confines of the landfill to an outside location where it was subsequently treated, for example, U.S. Pat. Nos. 3,586,624; 3,705,851 and 3,859,798. Some proposed to recycle the leachate, e.g., U.S. Pat. No. 3,859,799. Some mixed the waste with soil and added the mixture to the landfill. More recently designs have been proposed in which the landfill has a sloping bottom leading to a leachate basin, e.g., U.S. Pat. No. 4,358,221. Landfills with divided areas, or vaults have been proposed, and separate leachate collection systems for each vault have been suggested, see U.S. Pat. Nos. 4,350,461 and 4,430,021.

It is highly desirable, and one of the attributes of the present invention, that the leachate from the landfill does not drain from the confines of the landfill, but rather drains to a single, common low point within the landfill area for collection. It is also highly desirable that the landfill have a minimum of leachate accumulation in the fill in order to reduce the resultant hydraulic gradients to the most practical minimum level. However, landfills typically occupy relatively large areas and the amount of atmospheric precipitation, rain and snow, which is collected in the present day leachate collection systems can increase the volume of the leachate which must be handled by more than four or five times the volume of the leachate generated using the present invention. Thus, until the fill is closed and sealed, the area of the fill acts as a large collection pond for atmospheric precipitation which is added to the leachate. The cost of handling and treating the cumulative leachate is significantly increased. Since it is not economically feasible to excavate, prepare and line and subsequently close and seal a single vault for each increment of waste, the problem of handling and treating leachate grows greater every time it rains.

In many jurisdictions it is not uncommon that the landfill operator is required to place money in a closure fund, typically in an amount that is sufficient to cover the expense of hiring an outside third party to close and secure the landfill. The closure fund is not fully released until the operator has closed and sealed the fill in a satisfactory and approved manner. Under such circumstances a landfill operator may have a substantial amount of money tied up in a closure fund for a period of several years.

The present invention seeks to provide an improved secure landfill, a method of operating such landfill, a solution to the excess leachate problem, and further, a means by which the landfill operator may incrementally close and seal off portions of the fill and thereby also incrementally reduce, or receive back, monies that the landfill operator originally deposited in a closure or escrow fund which is usually kept intact until the final permanent closing of the entire landfill.

Heretofore because of such economic considerations conventional landfill areas seldom ranged larger than from about three to about six to ten acres. In contrast the present invention enables a more efficient use of the landfill site and makes possible the economic operation of landfill areas on the order of from about twenty to as much as thirty to fourty acres. In this manner the present invention significantly lessens the total number of individual landfill sites that otherwise would be required.

BRIEF DESCRIPTION OF THE INVENTION

The present invention relates to a secure landfill and to a method of operating a hazardous waste secure landfill characterized by a substantial reduction in the amount of leachate. The amount of leachate is minimized by maintaining a substantial amount of the atmospheric moisture collected within the confines of the fill separate from the waste material in the fill and removing such uncontaminated moisture from the fill site in an uncontaminated condition. The present landfill arrangement also facilitates the progressive incremental closing and permanent sealing of portions of the landfill while the remainder of the fill remains in active use.

The present landfill is divided by berms or dikes into a plurality of separate water tight zones, or vaults. The landfill has a common low area, or point, to which liquids within the landfill flow and can be centrally collected and monitored. Preferably each zone or vault has a separate collection and monitoring system. The atmospheric moisture is collected from the various zones, vaults, or subdivisions thereof, which are not in active use and is disposed of outside the confines of the fill without contact with the waste material and without mixing with the leachate or drainage from areas of the fill in active use. As a zone, vault, or subdivision thereof, is filled with waste the filled area is closed and permanently sealed. In this manner the landfill is progressively incrementally closed and permanently sealed.

DETAILED DESCRIPTION AND PREFERRED EMBODIMENT OF THE INVENTION

The present invention relates to a secure landfill for hazardous wastes, and to a method of utilizing such a landfill. In accord with the present invention a permanent disposal site is selected by the site operator and prepared for the disposal of hazardous waste which, typically is supplied to the site in bulk, for example, by dump truck, or in containers, for example, fiber, steel or plastic drums. The disposal site is originally selected, and, if required, subsequently excavated, to provide a disposal site having a generally concave contour. The site has a common low area or point. Suitably the site is contoured so that the slope of the foundation toward the low area or point is greater than 2% and preferably between about 3% to about 9%. The foundation of the disposal site is typically of native, on-site material.

The foundation is lined with a sub-base comprised of a layer of substantially impermeable material. Preferably the sub-base is a layer of clayey material. Bentonite clays are aptly suited to use as the sub-base. By "substantially impermeable" or "substantially water impermeable" is meant that the lining material will pass water under a pressure of 165 pascals at a rate of less than $1 \times 10^{-7}$ cm/sec. The sub-base generally ranges in compacted thickness from about 2 feet to about 8 feet, and more preferably from about 3 feet to about 4 feet. Suitably the sub-base is layered in place over the foundation and lines the entire landfill area.

Preferably the sub-base has a top layer, generally ranging between about six and about eighteen inches, of compacted processed clay (clay that has been dryed and screened). Typically the clay sub-base is compacted in six inch lifts to obtain a 90 to 95% standard proctor density.

Appropriately, at this point in the construction of the landfill the operator makes a preliminary selection as to the number and size of the separate zones, or vaults, or subdivisions thereof, that may be required for the various types and amounts of waste materials that will be placed in the landfill. For example, there may be separate zones designated for heavy metal wastes, organic wastes, pseudometallic or amphoteric waste, each sized to meet the amounts of waste materials expected to be received in the fill. Each zone, or vault, is located so that a portion thereof is contiguous to the common low area or point of the landfill. In such arrangement each zone, or vault, drains toward the common low area or point. Suitably, at this time preliminary, or rudimentary, berms, or dikes of clayey material outlining the various zones or vaults, any access roads that may be required, or any desired subdivisions of zones or vaults, are positioned atop the clay sub-base. The preliminary foundations preferably have a trapezodial cross section to facilitate their build-up (widening and raising) to obtain operational berms or divisions.

The clay sub-base and the preliminary berms and divisions are next overlayed with a continuous layer, or liner, of water impervious material, suitably in film form, contoured to the landfill surface area. The layer or liner may be placed on the sub-base in strips and the edges of the strips secured together, suitably by welding, to obtain a leak-proof or water-tight layer. The layer, or liner, preferably also extends outside the confines of the landfill and is secured along the outer periphery of the fill. The water impervious layer, or liner, is preferably fabricated of a preformed film of an inert, substantially unreactive, synthetic material. Polyethylene, polypropylene, polyethylene terephthalate are useful, particularly useful is high density polyethylene. Typically film thicknesses in the range between about 30 and about 50 mils are aptly suited to use.

Suitably at this time operative berms or dikes are built or installed in the fill. Usually these will be built or installed by the addition of further increments of clayey material over the previously described preliminary berm or dike foundation structures.

A secondary leachate collection system, which is more a leachate leak detection system, is next installed atop the water impervious liner. The secondary leachate collection system consists of a plurality of permeable collection pipes positioned on the liner and surrounded by, or embedded in, a layer of aggregate material. The collection system drains toward the common low area or point of the fill. The collection pipes are fabricated of a chemically inert, substantially inactive material such as high density polyethylene. The collection pipes are arranged to generally radiate outward from the low area or point of the fill and suitably include lateral connections as the radially arranged pipes extend outward toward the periphery of the fill. The aggregate material, containing the permeable collection pipes generally ranges from between about twelve to about eighteen inches in thickness. The embedded permeable pipes typically range from about three to six inches in diameter. Suitable examples of aggregate materials are sand, gravel, shale, crushed stone, or mixtures thereof. The aggregate material preferably has a minimum permeability of $1 \times 10^{-2}$ cm/sec. In a particularly useful embodiment the collection pipes are surrounded by a layer of ¼ inch diameter crushed stone while the remainder of the layer consists of coarse granular sand. The collection pipes and the aggregate material of the secondary leachate collection system direct any liquid to the low area or point of the fill. A means such as a sump, or standpipe, for receiving and collecting the drainage from the secondary leachate collection system is positioned at or near the low area or point of the fill. The receiving and collecting means may be specific to a single zone or vault. It will be noted that the secondary leachate collection system underlines, and enables monitoring of, the entire evacuated area.

The layer containing the secondary leachate collection system is surface evened, or leveled, and overlayed with a continuous layer, or liner, which suitably consists of a film of water impervious material similar to that previously described to overlay the sub-base, except the present layer is preferably thicker. A thickness ranging between 60 and 100 mils is most useful.

At this point in the construction of the landfill, the operator constructs, or completes the construction of berms, or dikes. The berms, or dikes, divide the landfill area into separate areas for the various types of waste that will be interred, and further into areas that are in active landfill use and areas which will not be placed in active landfill use. The berms, or dikes, are constructed of a substantially impermeable material such as, clay. Typically the berms, or dikes, are built, or raised, only to a height that may be required in the relatively near future. For example, it is desirable to have the berms, or dikes, which also are access roads start at a relatively low level in the fill to reduce waste drop height and later progressively raise such access roads by the addition of further impermeable material as the filling operation progresses.

A primary leachate collection system is positioned atop the water impervious layer or liner. Although the primary leachate system occupies a single layer of the fill, it is made up of a plurality of individual collection systems which individually collect liquids from separate zones, or vaults, in the fill. The secondary leachate system, described above, may be viewed as substantially continuous as it occupies a single layer and receives drainage from either the entire landfill or a relatively few separate areas. The primary leachate collection system may be viewed as substantially discontinuous as it occupies a single layer of the fill, but separately drains a plurality of separate areas of the fill.

The primary leachate collection system is comprised of a plurality of permeable collection pipes positioned contiguous to the liner layer over the secondary leachate collection system. The pipes are surrounded by, or embedded in, a layer of aggregate material. The system drains toward the common low area or point of the fill. Preferably the aggregate material surrounding the collection pipes is crushed stone and the remainder of the aggregate layer is coarse granular sand. The layer of aggregate material containing the primary leachate collection system generally ranges from about one to about two feet in thickness. The permeable collection pipes usually range from about four to about eight inches in diameter and are suitably fabricated of a chemically inert, substantially inactive material such as high density polyethylene. The pipes of the primary leachate collection system generally radiate outward from the common low area or point of the fill and suitably include lateral connections as the radially arranged pipes extend further outward toward the periphery of the fill.

The top of the aggregate layer containing the primary leachate collection system is them evened, or leveled, and overlayed with a substantially continuous layer of geotextile material. Geotextile materials are typically permeable, nonwoven fabrics made of continuous filaments of an inert polymer, such as polypropylene, which are spunbonded and needle punched. Such fabrics are substantially completely chemically and biologically inert. Fibertex geotextile fabric material a product of Crown Zellerbach Corporation is an example of such fabrics which are apty suited to use in the present invention.

It will be pointed out that each of the present zones, vaults, or subdivisions thereof are positioned so that the drainage is toward the common low area or point of the fill. In this manner leachate or liquid from each zone, vault or subdivision thereof can be maintained separate and individually drained and monitored. If the liquid is uncontaminated, e.g., atmospheric moisture, it may then be discharged, without treatment, outside the confines of the landfill. If the liquid is found to be contaminated, it is treated external to the fill and subsequently returned to the environment in a cleansed form.

DESCRIPTION OF THE DRAWINGS

The present invention will now be described in conjunction with the accompanying drawings in which similar numbers represent similar components in each of the several views.

Figure 1:
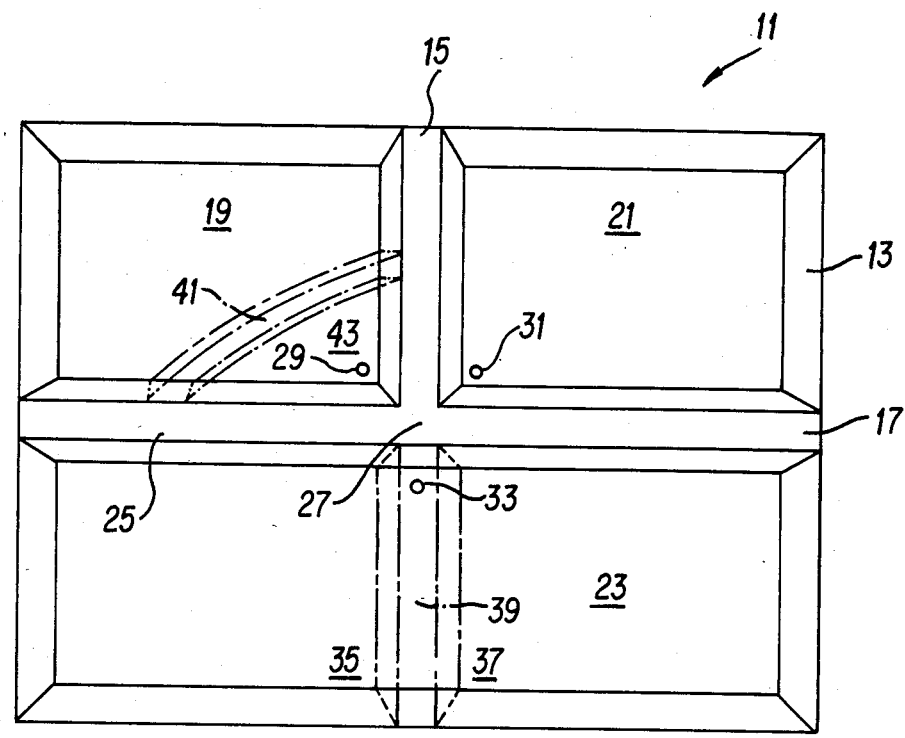
FIG. 1 is a top view of a landfill in accord with a preferred embodiment of the invention.

Looking now at FIG. 1 in detail, the landfill, generally denoted as 11, has a periphery berm 13 extending therearound. Depending upon the topography of the fill site, a periphery berm, such as, 13, may or may not be needed or desired. Although the landfill area is illustrated as rectangular in shape, it will be understood that the fill may be in various shapes and the shape shown in FIG. 1 is not a limiting characteristic of the invention. Within landfill 11 are berms, or dikes, such as 15 and 17, which divide the landfill into separate zones, or vaults, such as, 19, 21 and 23. The berms or dikes separate each zone or vault, one from another, in a water-tight manner. The berms or dikes preferably have a generally trapezodial cross-section and a crest surface, such as, 25. Typically some of the crest surfaces, such as, 25, especially those on major separations or divisions, are of a size that the crest surface also serve as an access road enabling waste materials to be transported to close proximity to the appropriate zone or vault.

Landfill 11 has a common low area or point 27 to which zones 19, 21 and 23 slope and naturally drain. Separate sumps at the bottom of standpipes 29, 31 and 33 receive drainage from a secondary leachate collection system located beneath each of the individual zones. Under normal operating conditions the amount of leachate collected by the secondary leachate collection system is minimal and substantially none except for normal underground seepage and possibly minor leakage from the edges of the fill. The secondary leachate collection system is in place to detect any unwanted large amounts of ground water leaking into the fill from beneath the fill site and to detect any leakage from the fill proper positioned above the system. While neither event is contemplated, the secondary leachate collection is present to provide for such contingency.

The zones or vaults may be subdivided into smaller subzones, or subvaults. For example, zone 23 may be divided into subzones 35 and 37 by an additional berm, or dike, such 39 as shown in FIG. 1 by dashed lines. Thus, subzone 37 may be utilized as a disposal area and subzone 35 may remain unused The uncontaminated drainage or run-off from atmospheric moisture from subzone 35 may then be collected and removed from the site area without treatment. The subzones may again be subdivided by temporary dikes, such as 41, shown in dashed lines, dividing zone 19 into a smaller subzone 43 for initial active use and maintaining the remainder of the area of zone 19 separated enabling the segregation of uncontaminated atmospheric moisture. Such uncontaminated moisture may subsequently be disposed of, without treatment, outside the confines of the fill.

Figure 2:
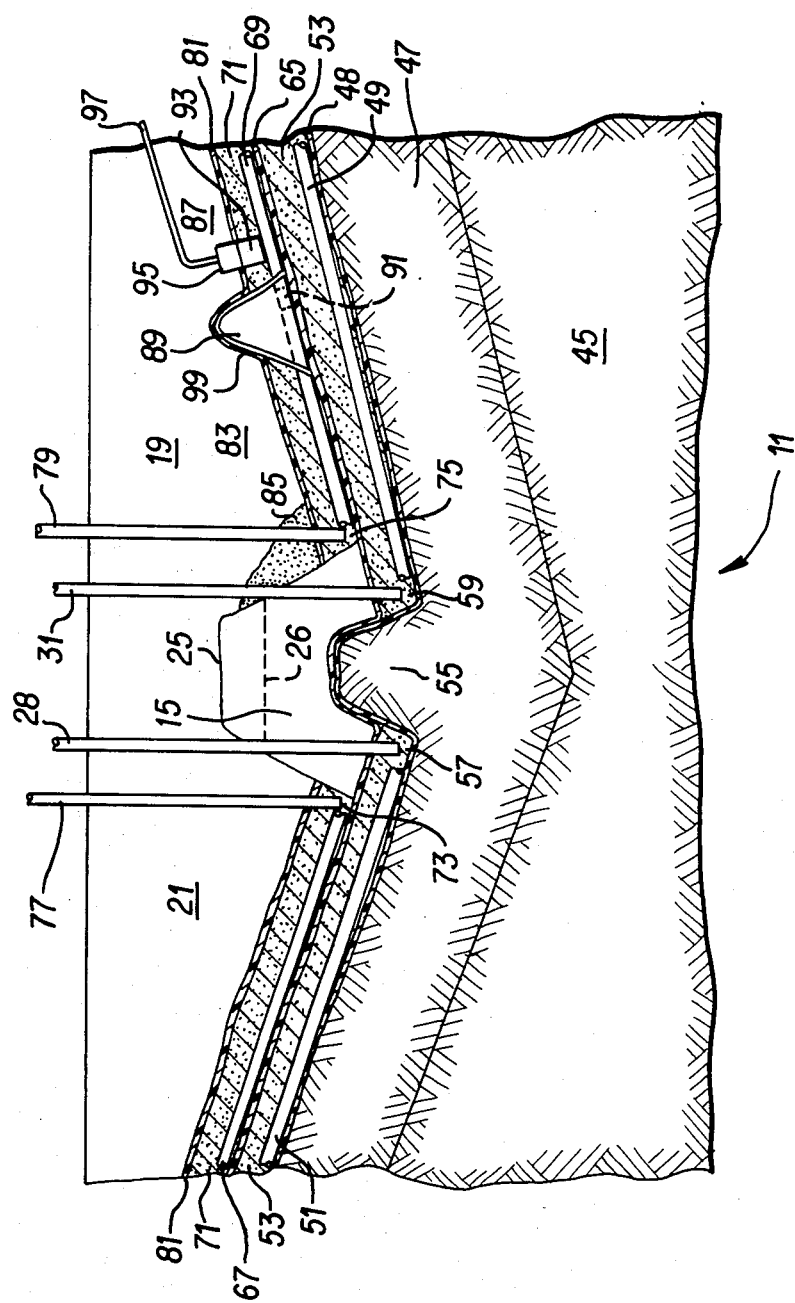
FIG. 2 is a side elevational view showing a portion of the landfill of FIG. 1 as it would appear in use.

FIG. 2 illustrates the monitoring and detection systems in greater detail and also illustrates how the fill may be incrementally and progressively closed and sealed. Lanfill 11 has a generally concave contour. The contour may be natural, or excavated, or more likely, a combination of both. The fill has a foundation typically of native earth 45. A sub-base, 47, consisting of a layer of substantially water impermeable material, suitably a clay, such as Bentonite clay, is positioned atop foundation 45. The sub-base ranges in compacted thickness from about three to about five feet.

Sub-base 47 is overlayed with a liner of impervious film 48. Film 48 is suitably fabricated of a synthetic material which is substantilly inert and unreactive in the landfill environment. Materials such as polyethylene, polypropylene, polyethylene terephthalate are useful. High density polyethylene is particularly useful. The film thickness typically ranges between about 30 and about 50 mils.

A secondary leachate collection system comprised of a plurality of permeable collection pipes, such as, 49 and 51 positioned over liner 48 and embedded in a layer of aggregate material, 53, suitably of coarse sand drains toward a common low area or point in the fill. Although a single sump for receiving all liquid flow within the fill may be positioned at the common low point, it is preferred that the landfill area be divided into separate major sections by berms or dikes, such as, 55, which enables individual monitoring of each of the underlying portions of the fill. In this manner, collection pipes 49 and 51 separately drain into individual sumps 57 and 59 which are suitably connected to separate standpipes, such as, 29 and 31.

Liquids that accumulate in the secondary leachate collection system drain to an appropriate sump and are removed, suitably by a pump means, not shown. The accumulated moisture is then tested. If it shows no contamination, as it would if it were outside ground water seeping into the site, it would be discharged, without treatment, outside the confines of landfill 11. In the unlikely event that such water would show contamination it would then be treated external to the landfill and subsequently returned to the environment in a cleansed form. If contamination is detected, it would indicate that leakage has occurred in the fill proper and appropriate remedial action would immediately be taken to repair the leak. In the preferred embodiment wherein separate drainage systems serve separate areas of the fill, the type of contamination would indicate the portion or area of the fill in which the leak had occurred.

A layer of impervious film, such as water impervious liner 65 is positioned atop aggregate layer 53. The layer is preferably fabricated of a preformed film of an inert, substantially unreactive, synthetic material, such as polyethylene, polypropylene or polyethylene terephthalate. Preferably the film ranges in thickness between about 50 and about 100 mils.

A plurality of berms or dikes, such as, 15, suitably of a substantially impermeable or clayey material, such as Bentonite clay are positioned atop film 65. Suitably such berms, or dikes, may be constructed by building up previously constructed preliminary berms or dikes. Berms, or dikes, such as, 15, divide landfill 11 into a number of zones or vaults, such as 19 and 21.

A primary leachate collection system is positioned atop layer 65. The primary leachate collection system is comprised of a plurality of permeable collection pipes, such as, 67 and 69, embedded in separated beds or layers of aggregate material 71 which drain toward a common low area or point in the fill. Collection pipes 67 and 69 separately drain into individual sumps 73 and 75 which are separately connected to standpipes 77 and 79. Such an arrangement enables the separate monitoring of leachate from individual zones or vaults, or from individual subzones or subvaults, and the separate removal of leachate from separate areas for appropriate treatment.

The top of aggregate layer 71 is evened or leveled and preferably overlaid with a layer of geotextile material 81.

As shown best in FIG. 2, zone or vault 19 may be subdivided into an area in active landfill use, such as, 83, which contains waste 85 and an area which is not in active landfill use, such as, 87, by means of a berm or dike 89. Berm or dike 89 is suitably based on liner layer 65. Permeable pipe 67 extends through the base of berm 89. Pipe 69 has a temporary plug, 91, therein positioned at a point prior to the entrance of pipe 69 into area 83, the active use area. A collection sump, such as, 93, is positioned to receive liquids accumulating in area 87. Liquids are held in the area by berm 89 and plug 91 in pipe 69. The atmospheric moisture collected by sump 93 is subsequently pumped by pump 95 through line 97 to be discharged, without treatment outside the confines of the landfill. A water-impervious protective cover, such as, 99, may be positioned atop berms, such as, 89. The cover is suitably in the form of a continuous film similar to that used to overlay the sub-base. A film having a thickness between about 30 and about 100 mils is aptly suited to use. In a particularly useful embodiment, film layer 65 may be overlayed on aggregate layer 53 of the secondary leachate collection system so that there are overlapping portions. Such portions are utilized as protective covers, such as, 99, atop retaining berms, such as, 89. Similarly other areas of the landfill not in active landfill use are equipped with retaining berms and water removal means. As the various portions of the fill are filled with waste, the area available for waste is expanded by removing the retaining berm, such as, 89 and moving the water retaining, collecting and removal means into position behind another retaining berm located further toward the periphery of the fill. Thus as additional areas are placed in active landfill use, the atmospheric moisture collection points previously used become part of the primary leachate collection system and new atmospheric moisture collection points are established closer to the periphery of the fill.

FIG. 2 also illustrates an additional aspect of the present invention wherein berm 15 is progressively raised as the landfill is filled. Berm 15 has crest surface 25 and suitably used as an access road. As waste is added to the fill it is packed against the sides of berm 15. As the height of the waste approaches the top of berm 15, additional amounts of substantially water impermeable material, for example, clay, is added to crest surface 25. In this manner the access road is incrementally built to its ultimate height and the problem of waste being dropped or dumped from high elevations is eliminated. Dashed line 26 indicates a previous level of crest surface 25.

Figure 3:
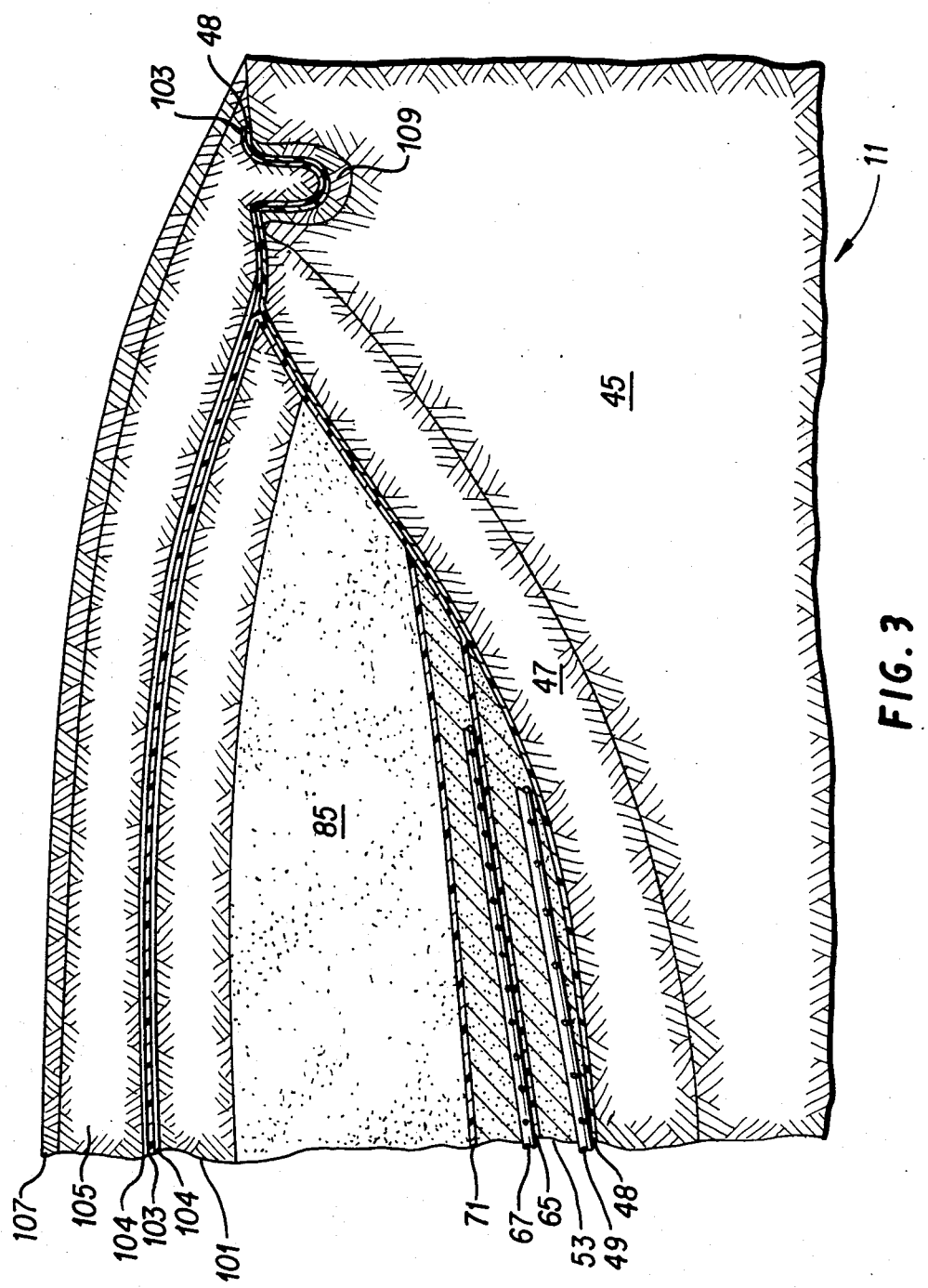
FIG. 3 is a partial side elevational view, in section, showing a portion of the landfill as it would appear after it has been closed and secured.

FIG. 3 illustrates a portion of the fill as it is closed and sealed. The deposited waste material 85 is covered with a mounded layer of substantially water impermeable material, 101, suitably clay, ranging in thickness from about three to about five feet. Layer 101 is then overlaid with a water impervious liner suitably fabricated of an continuous film, 103, such as that previously described. Film liner 103 is suitably sealed, or welded to film layer 48 along the periphery of the fill to permenantly encase waste 85. In a preferred embodiment film liner 103 is sandwiched between layers of geotextile fabric, 104. Film liner 103 is suitably in turn covered by a layer of indigenous earth 105, typically ranging between about three and five feet in thickness. Earth layer 105 is then topped with a layer of top soil 107, typically from about six to about twelve inches in thickness. As a further securing measure, film liner 65 and film liner 103 may be extended beyond the periphery of the fill and secured in a trench, such as, 109. Trench 109 may then filled in and covered, for example, with earth layers 105 and 107.

The present invention provides a means of materially reducing the amount of leachate which results in a substantial saving in handling and treatment costs. Leachate volume reductions if the neighborhood of 75% are easily attained, and reductions in the neighborhood of 90% are to be expected.

While the present invention has been described by means of specific embodiments, it will be understood that modifications may be made without departing from the spirit of the invention, for example, the landfill may include more than one secondary or primary leachate collection systems, or may include additional separating layers, therefore the scope of the invention is not to be considered as limited by the specific illustrations, but rather is defined by the appended claims.

What is claimed is:

1. A hazardous waste landfill comprising:
   (a) a foundation having generally concave contour having side portions and a bottom portion, said foundation having a common low area or point to which liquids within the landfill can be centrally collected,
   (b) a sub-base comprised of a substantially water impermeable material, said material lining said side and bottom portions of said foundation,
   (c) a first continuous, water impervious synthetic liner overlaying said sub-base,
   (d) a secondary leachate collection system positioned atop said liner, said collection system comprised of a plurality of permeable pipes imbedded in a layer of aggregate material, said system draining toward said common low area or point,
   (e) means for collecting and removing liquid from said secondary leachate collection system,
   (f) a second continuous water impervious synthetic liner overlaying said secondary leachate leak collection system,
   (g) a plurality of berms fabricated of substantially water impermeable material positioned atop said second liner dividing the landfill area into a plurality of separate water tight zones,
   (h) a primary leachate collection system positioned atop said second liner overlaying said secondary leachate collection system, comprised of a plurality of permeable pipes embedded in a layer of aggregate material, said system draining toward said common low area or point, and
   (i) means for collecting and recovering liquids from said primary leachate system.

2. The landfill of claim 1 wherein said substantially water impermeable materials are clay.

3. The land fill of claim 1 wherein said sub-base ranges between about two and about eight feet in thickness.

4. The landfill of claim 1 wherein the said water impervious materials are high density polyethylene.

5. The landfill of claim 1 wherein the substantially water impermeable material in said berms is clay.

6. The landfill of claim 1 wherein at least one of said berms is an access road.

7. A method of operating a hazardous waste landfill comprising the steps of:
   (a) forming a disposal site having a common low area or point,
   (b) lining said disposal site with a layer of substantially water impermeable material,
   (c) dividing said disposal site into water tight zones to form at least one zone for active use in receiving hazardous waste and at least one zone free of hazardous waste and not in active use,
   (d) collecting separately the drainage from each zone, and
   (e) discharging the uncontaminated drainage from said zones free of hazardous waste and not in active use outside said disposal site.

8. The method of claim 7 wherein said substantially water impermeable material is clay.

* * * * *